US009607729B2

(12) United States Patent
Sakai

(10) Patent No.: US 9,607,729 B2
(45) Date of Patent: Mar. 28, 2017

(54) BINDER PITCH AND METHOD FOR PRODUCING THE SAME

(71) Applicant: JFE CHEMICAL CORPORATION, Tokyo (JP)

(72) Inventor: Minoru Sakai, Tokyo (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/510,527

(22) Filed: Oct. 9, 2014

(65) Prior Publication Data

US 2016/0104553 A1 Apr. 14, 2016

(51) Int. Cl.
*C01C 1/00* (2006.01)
*H01B 1/24* (2006.01)

(52) U.S. Cl.
CPC .................................... *H01B 1/24* (2013.01)

(58) Field of Classification Search
CPC ..... D01F 9/12; D01F 9/14; D01F 9/15; C10C 3/00; C10C 3/14; C10C 3/002; C10C 3/04; B01J 23/76; B01J 23/88; C01B 31/04
USPC ........... 423/447.2; 208/39, 44, 22, 309, 314; 429/231.8; 252/511
See application file for complete search history.

(56) References Cited

U.S. PATENT DOCUMENTS 4,597,853 A * 7/1986 Moriya ..................... C10C 3/00 208/22
5,525,558 A * 6/1996 Niwa ...................... C04B 35/83 156/242

FOREIGN PATENT DOCUMENTS

JP 03197590 A * 8/1991
JP H09-87636 A 3/1997
JP 2000204375 A * 7/2000
JP 2007327033 A * 12/2007
JP 2013-237747 * 11/2013 .............. C08L 95/00

OTHER PUBLICATIONS

Machine translation of Tawara et al., 2015.*

* cited by examiner

*Primary Examiner* — Khanh Tuan Nguyen
(74) *Attorney, Agent, or Firm* — Oliff PLC

(57) ABSTRACT

The object of the present invention is to provide a binder pitch increased in carbonization yield (fixed carbon content) without varying the softening point thereof. A binder pitch has a carbon-to-hydrogen molar ratio of 1.90 or more, a quinoline insoluble content of 12.0% to 30.0% by mass, a free carbon content of 12.0% to 30.0% by mass, a mesophase content of 0.50% by mass or less, a toluene insoluble content of 24.0% by mass or more, and a fixed carbon content of 58.0% by mass or more.

4 Claims, No Drawings

BINDER PITCH AND METHOD FOR PRODUCING THE SAME

DETAILED DESCRIPTION OF THE INVENTION

Technical Field

The present invention relates to a binder pitch used for a carbon material for electrodes for aluminium smelting, graphite electrodes for steelmaking, and the like and a method for producing the binder pitch.

Background Art

A binder pitch is used as a binder for filler coke and is usually produced by thermally reforming a soft pitch.

The soft pitch is residue obtained by distilling off low-boiling point oils such as naphthalene oil and anthracene oil from coal tar. The soft pitch has a low softening point of 40° C. to 70° C. and contains excessive amounts of light components and insufficient amounts of heavy components. Therefore, in order to use the soft pitch as a binder for carbon materials such as carbon electrode materials, the soft pitch is known to be thermally reformed at a temperature 350° C. to 450° C. such that the soft pitch is condensed to a predetermined level and is increased in molecular weight.

As the binder pitch wets the surface of filler coke better during the kneading of the binder pitch and the filler coke at a temperature not lower than the softening point of the binder pitch, more readily penetrates open pores in the filler coke, and has higher carbonization yield (fixed carbon content), the binder pitch can increase the density of a carbon material. The increase of carbonization yield and the increase in density of the carbon material enable an increase in mechanical strength and a reduction in electrical resistivity to be achieved and therefore properties preferable for electrodes for aluminium smelting, graphite electrodes for steelmaking, and the like can be achieved.

Increasing the proportion of heavy components in the binder pitch is effective in increasing the carbonization yield thereof. The proportion of the heavy components in the binder pitch can be increased by increasing the softening point of the binder pitch. However, a temperature about 50° C. higher than the softening point of the binder pitch is necessary to knead the binder pitch with the filler coke. Therefore, when the softening point thereof is high, there is a problem in that a facility load is very large. In the case where a large amount of mesophase is produced when the proportion of caking components in the binder pitch is increased by thermal reforming, there is a problem in that the penetration of the binder pitch into the open pores in the filler coke is significantly inhibited.

For example, PTL 1 discloses a binder pitch having a softening point sufficient to mix the binder pitch with filler coke. The binder pitch is intended to have good wettability with the filler coke. The binder pitch is produced by thermal treatment such that the content of free carbon is adjusted to 5% to 10% by weight and 0.5% to 5% by weight of mesophase is produced at a temperature 350° C. to 450° C. However, the increase in carbonization yield with respect to the same softening point is insufficient.

CITATION LIST

Patent Literature

[PTL 1] Japanese Unexamined Patent Application Publication No. 9-87636

SUMMARY OF INVENTION

Technical Problem

The increase in carbonization yield of a binder pitch increases the density of a carbon material. This enables an increase in mechanical strength and a reduction in electrical resistance to be achieved. However, in the above-mentioned conventional technique, the increase in carbonization yield with respect to the same softening point is insufficient and therefore the effect of enhancing electrode performance cannot be expected too much.

Accordingly, it is an object of the present invention to provide a binder pitch increased in carbonization yield (fixed carbon content) without varying the softening point thereof.

Solution to Problem

The inventors have made intensive investigations to achieve the above object. As a result, the inventors have found that the carbonization yield (fixed carbon content) of a binder pitch can be increased without varying the softening point thereof in such a way that the free carbon content of the binder pitch is adequately controlled.

The present invention is as described below (1) to (3).

(1) A binder pitch has a carbon (C)-to-hydrogen (H) molar ratio (C/H ratio) of 1.90 or more, a quinoline insoluble (QI) content of 12.0% to 30.0% by mass, a free carbon (primary QI) content of 12.0% to 30.0% by mass, a mesophase (secondary QI) content of 0.50% by mass or less, a toluene insoluble (TI) content of 24.0% by mass or more, and a fixed carbon (FC) content of 58.0% by mass or more.

(2) The binder pitch specified in Item (1) further has a softening point (SP) of 90° C. to 120° C.

(3) A method for producing a binder pitch includes a distillation step of distilling coal tar with a quinoline insoluble (QI) content of 3.0% to 25.0% by mass to obtain a soft pitch and a thermal reforming step of thermally reforming the obtained soft pitch at a temperature of 320° C. to lower than 350° C. to obtain the binder pitch specified in Item (1) or (2).

Advantageous Effects of Invention

A binder pitch according to the present invention does not vary the softening point thereof and has high carbonization yield. Therefore, a carbon material produced using the binder pitch has increased density. This enables an increase in mechanical strength and a reduction in electrical resistivity to be achieved. The binder pitch is particularly useful in producing a carbon material for electrodes for aluminium smelting, graphite electrodes for steelmaking, and the like.

DESCRIPTION OF EMBODIMENTS

The present invention is further described below in detail.

<Binder Pitch>

A binder pitch according to the present invention has a carbon (C)-to-hydrogen (H) molar ratio (C/H ratio) of 1.90 or more, a quinoline insoluble (QI) content of 12.0% to 30.0% by mass, a free carbon (primary QI) content of 12.0% to 30.0% by mass, a mesophase (secondary QI) content of 0.50% by mass or less, a toluene insoluble (TI) content of 24.0% by mass or more, and a fixed carbon (FC) content of 58.0% by mass or more.

Since the binder pitch has a carbon (C)-to-hydrogen (H) molar ratio (C/H ratio) of 1.90 or more, a quinoline insoluble (QI) content of 12.0% to 30.0% by mass, a free carbon (primary QI) content of 1.2.0% to 30.0% by mass, a mesophase (secondary QI) content of 0.50% by mass or less, and a toluene insoluble (TI) content of 24.0% by mass or more, the fixed carbon (FC) content, that is, the carbonization yield of the binder pitch is high, 58.0% by mass or more.

This configuration allows the binder pitch to have a softening point (SP) of 90° C. to 120° C. and prevents the softening point thereof to be varied.

<C/H Ratio>

In the binder pitch, the molar ratio (C/H ratio) of carbon (C) to hydrogen (H) is 1.90 or more. Since the C/H ratio of the binder pitch is 1.90 or more, the binder pitch has high quinoline insoluble (QT) content and high aromaticity. Therefore, the fixed carbon (FC) content (carbonization yield) of the binder pitch is expected to be high.

The molar ratio (C/H ratio) of carbon (C) to hydrogen (H) in the binder pitch is preferably calculated from data obtained by the elemental analysis of the binder pitch. Elements in the binder pitch is analyzed in such a way that, for example, a sample taken from the binder pitch is completely combusted, a $CO_2$ gas and $H_2O$ gas thereby generated are determined, and the contents of carbon (C) and hydrogen (H) in the sample are determined. An elemental analyzer may be used.

<Quinoline Insoluble (QI) Content>

A quinoline insoluble (QI) is a heavy component and contains free carbon (a particle size of about 1 μm or less) that is a gas-phase product produced during the carbonization of coal and polymerized mesophase, produced during the thermal reforming of pitch, having a particle size of about 1 μm to 50 μm: the former is called primary QI and the latter is called secondary QI.

The quinoline insoluble (QI) content of the binder pitch is 12.0% to 30.0% by mass and is preferably 12.0% to 25.0% by mass. When the quinoline insoluble (QI) content thereof is within this range, the binder pitch is prevented from draining from a formed body during the calcination of a carbon material and a problem such as the reduction of the fixed carbon (FC) content (carbonization yield) can be avoided. Furthermore, the viscosity of a kneaded mixture of the binder pitch and filler coke can be maintained within a range not affecting kneading.

A method for measuring the quinoline insoluble (QI) content is preferably "15.1 Filtration method" or "15.2 Centrifugal method" of JIS K 2425:2006 (Test methods of creosote oil, prepared tar and tar pitch) and more preferably "15.1 Filtration method".

<Free Carbon (Primary QI) Content>

The free carbon (primary QI) content of the binder pitch is 12.0% to 30.0% by mass and is preferably 12.0% to 25.0% by mass. When the free carbon (primary QI) content thereof is within this range, caking properties of the binder pitch are ensured and the binder pitch is prevented from draining from a formed body during the calcination of the carbon material. Furthermore, a problem such as the reduction of the fixed carbon (FC) content (carbonization yield) can be avoided and the viscosity of a kneaded mixture of the binder pitch and the filler coke can be maintained within a range not affecting kneading.

Mesophase (Second QI) Content

<Mesophase (Second QI9) Content>

The mesophase (second QI) content of the binder pitch is 0.50% by mass or less. The mesophase (second QI) is produced when the content of a caking component in the binder pitch is increased by thermal reforming. When the mesophase (second QI) content of the binder pitch is 0.50% by mass or less, filling properties of the filler coke are prevented from being impaired by the fact that shell-shaped mesophase produced by crushing during kneading adhere to the filler coke, thereby enabling the density of the carbon material to be increased.

<Method for Measuring Free Carbon Content and Mesophase Content>

The free carbon (primary QI) content and mesophase (second QI) content of the binder pitch can be determined, for example, as described below.

First, the quinoline insoluble (QI) of the binder pitch is elementally analyzed and the molar ratio (the C/H ratio of the quinoline insoluble) of carbon (C) to hydrogen (H) is then calculated.

Next, the mesophase (second QI) content of the quinoline insoluble (QI) is determined from Equations (1) and (2) below using the C/H ratio of the quinoline insoluble on the assumption that the molar ratio (the C/H ratio of free carbon) of carbon (C) to hydrogen (H) in free carbon (primary QI) is 3.5 and the molar ratio (the C/H ratio of mesophase) of carbon (C) to hydrogen (H) in mesophase (secondary QI) is 2.1. The mesophase (second QI) content of the binder pitch is calculated from the mesophase (second QI) content of the quinoline insoluble (QI).

A value obtained by subtracting the mesophase (second QI) content from the quinoline insoluble (QI) content is regarded as the free carbon (primary QI) content.

$$(\text{C/H ratio of quinoline insoluble})=3.5\times(\text{free carbon (primary QI)content/quinoline insoluble(QI) content})+2.1\times(\text{mesophase(second QI)content/quinoline insoluble(QI)content}) \quad (1)$$

$$(\text{Free carbon(primary QI)content})+(\text{mesophase(second QI)content})=\text{quinoline insoluble(QI)content} \quad (2)$$

where the free carbon (primary QI) content, the mesophase (second QI) content, and the quinoline insoluble (QI) content are given in mass percent.

<Toluene Insoluble (TI) Content>

The toluene insoluble (TI) content of the binder pitch is 24.0% by mass or more. When the toluene insoluble (TI) content thereof is 24.0% by mass or more, the carbonization yield of the binder pitch is high and the increase in performance of the binder pitch due to the increase of the quinoline insoluble can be expected. A method for measuring the toluene insoluble (TI) content is preferably "14.2 Method of determination of toluene insoluble content in prepared tar and tar pitch" of JIS K 2425:2006 (Test methods of creosote oil, prepared tar and tar pitch).

<Fixed Carbon (FC) Content>

The fixed carbon (FC) content of the binder pitch is 58.0% by mass or more and is preferably 58.0% to 65.0% by mass. The fixed carbon (FC) content is an indicator for carbonization yield and, in general, correlates positively with the softening point (SP). However, in the present invention, the use of the above configuration allows the fixed carbon (FC) content to be increased without varying the softening point (SP). A method for measuring the fixed carbon (FC) content is preferably "11 Method of determination of fixed carbon content" of JIS K 2425:2006 (Test methods of creosote oil, prepared tar and tar pitch).

<Softening Point (SP)>

The softening point (SP) of the binder pitch is 90° C. to 120° C. and is preferably higher than 95° C. to 120° C. The softening point (SP) of the binder pitch is an indicator of the temperature at which the fluidity of the binder pitch appears. This indicator is important particularly in a step of forming a kneaded mixture of the binder pitch and the filler coke. When the softening point (SP) of the binder pitch is high, existing facilities cannot be used, facilities resistant to high temperature are needed, and an increase in energy consumption for heating is caused. Therefore, it is necessary not to significantly vary the softening point of a conventional binder pitch. A method for measuring the softening point (SP) of the binder pitch is preferably "8.1 Manual measuring method" or "8.2 Automatic measuring method" of JIS K 2425:2006 (Test methods of creosote oil, prepared tar and tar pitch) and more preferably "8.1 Manual measuring method".

<Viscosity>

The viscosity is an indicator representing one of properties of the binder pitch. The viscosity of the binder pitch is important in kneading the binder pitch with the filler coke. The kneading temperature (the temperature during kneading) is preferably set to a temperature about 50° C. higher than the softening point of the binder pitch. Therefore, the temperature at which the viscosity of the binder pitch is measured preferably ranges from 140° C. to 170° C. and is more preferably 160° C. A method for measuring the viscosity of the binder pitch preferably complies with ASTM D 5018-89 (2009) (Standard Test Method for Shear Viscosity of Coal-tar and Petroleum) or JIS Z 8803:2011 (Methods for viscosity measurement of liquid) and more preferably complies with ASTM D 5018-89 (2009).

<Method for Producing Binder Pitch>

A method for producing the binder pitch according to the present invention includes a distillation step of distilling coal tar with a quinoline insoluble (QI) content of 3.0% to 25.0% by mass to obtain a soft pitch and a thermal reforming step of thermally reforming the obtained soft pitch at a temperature of 320° C. to lower than 350° C. to obtain the binder pitch.

According to the present invention, the binder pitch, which is increased in carbonization yield (fixed carbon content) without varying the softening point, can be produced.

(1) Distillation Step

<Coal Tar>

The coal tar is generally one recovered by cooling and condensing gas generated by carbonizing coals such as bituminous coal and subbituminous coal in a coke oven at a temperature of 1,100° C. to 1,350° C. The recovery rate of the coal tar varies depending on the types of the coals and operating conditions of the coke oven and is about 3% to 5% by mass of the coals.

In the method for producing the binder pitch, the coal tar (raw coal tar) is not particularly limited, may have a quinoline insoluble (QI) content of 3.0% to 25.0% by mass, and can be used as a raw material for the binder pitch.

<Soft Pitch>

The soft pitch is residue obtained by distilling off low-boiling point oils such as naphthalene oil and anthracene oil from the coal tar. The soft pitch preferably has a softening point of about 70° C. or lower and more preferably about 40° C. to 70° C. A method for measuring the softening point (SP) of the soft pitch is preferably "8.1 Manual measuring method" or "8.2 Automatic measuring method" of JIS K 2425:2006 (Test methods of creosote oil, prepared tar and tar pitch) and more preferably "8.1 Manual measuring method".

<Distillation>

The raw coal tar is preferably distilled in a distillation column with a large number of theoretical plates. The raw coal tar may be distilled at atmospheric or reduced pressure and is preferably distilled at reduced pressure. The distillation of the coal tar at reduced pressure allows light components in the coal tar to be efficiently distillated off. The distillation temperature of the coal tar is preferably 260° C. to 340° C. The pressure in a vessel for distilling the coal tar at reduced pressure is preferably 20 mmHg to 150 mmHg.

(2) Thermal Reforming Step

<Thermal Reforming>

The soft pitch, which is obtained by distilling the raw coal tar, may possibly be short of a β-component which is a quinoline-insoluble, toluene-insoluble heavy component and therefore causes the increase in molecular weight of pitch in the thermal reforming step.

Temperature and Time

<Temperature and Time>

A conventional binder pitch is known to be produced in such a way that a soft pitch is thermally reformed at a temperature of 350° C. to 450° C. such that the amount of a caking component is increased. However, in the present invention, the thermal reforming temperature of the soft pitch is 320° C. to lower than 350° C. It is preferred that the thermal reforming temperature of the soft pitch is 320° C. to lower than 350° C. and the thermal reforming time of the soft pitch is 0.5 hour to 8 hours. It is more preferred that the thermal reforming temperature thereof is 330° C. to 345° C. and the thermal reforming time thereof is 1 hour to 6 hours. When the thermal reforming temperature of the soft pitch is lower than 320° C., the increase of molecular weight is unlikely to occur. When the thermal reforming temperature of the soft pitch is 350° C. or higher, a portion of the soft pitch is thermally degraded or a large amount of mesophase is produced.

<Pressure>

The soft pitch may be thermally reformed at atmospheric or reduced pressure and is preferably thermally reformed at atmospheric pressure. In the case of thermal reforming the soft pitch at reduced pressure, the pressure in a vessel used is preferably 200 mmHg to 600 mmHg.

<Steam Injection>

Steam injection during thermal reforming reduces the rate of removing low-molecular weight components in comparison at the same softening point. Therefore, the molar ratio (C/H ratio) of carbon (C) to hydrogen (H) in the binder pitch accounts for less than 1.90 depending on the temperature and time of thermal reforming. When the C/H ratio thereof is less than 1.90, the aromaticity of the binder pitch does not increase with the increase of the quinoline insoluble (QI) content and therefore an increase in carbonization yield cannot be expected. Thus, it is preferred that steam is not injected into the soft pitch during thermal reforming.

The present invention is further described below in detail with reference to examples. The present invention is not limited to the examples.

EXAMPLES

Testing Methods for Binder Pitch

<Method for Measuring Softening Point>

The softening point of a binder pitch was measured by a method according to "8.1 Measuring method for softening point of tar-pitch (ring and ball method)—Manual measuring method" of JIS K 2425. In particular, a sample, taken from the binder pitch, passing through an 840 μm (20 mesh) sieve was heated and melted at a temperature not 50° C. higher than the estimated softening point thereof. The melted sample was poured into a ring having a diameter of 16 mm and a height of 6.4 mm and was fixed. The ring was put on a sample rack. A steel ball having a diameter of 9.525 mm and a mass of 3.5 g was put on a central portion of the ring. The rack was immersed in glycerin, which was heated at a rate of 5° C./minute. The temperature at which the sample was softened and therefore the steel ball reached a bottom plate located 25.4 mm below the ring was taken as the softening point of the sample.

<Method for Measuring Quinoline Insoluble Content>

The quinoline insoluble content of the binder pitch was measured by a method according to "15.1 Method of determination of quinoline insoluble content in tar pitch—Filtration method" of JIS K 2425. In particular, 1 g of a sample, taken from the binder pitch, passing through a 250 μm (60 mesh) sieve was dissolved in 20 mL of 75° C. quinoline for 30 minutes. A soluble was removed by suction filtration and residue was washed with quinoline and acetone, was dried, and was then weighed, followed by calculating the quinoline insoluble content thereof.

<Method for Measuring Toluene Insoluble Content>

The toluene insoluble content of the binder pitch was measured by a method according to "14.2 Method of determination of toluene insoluble content in prepared tar and tar pitch" of JIS K 2425:2006. In particular, 2 g of a sample, taken from the binder pitch, passing through a 250 μm (60 mesh) sieve was mixed with 100 mL of hot toluene, was heated, and was then dissolved for 30 minutes by reflux. A hot soluble was removed by suction filtration and residue was washed with toluene and acetone, was dried, and was then weighed, followed by calculating the toluene insoluble content thereof.

<Method for Measuring Fixed Carbon Content>

The fixed carbon content of the binder pitch was measured by a method according to "11 Method of determination of fixed carbon content" of JIS K 2425:2006. In particular, 1 g of a sample, taken from the binder pitch, passing through a 250 μm (60 mesh) sieve was put in a ceramic crucible equipped with a drop lid and was heated for 30 minutes in an electric furnace maintained at 430° C. with the ceramic crucible uncovered, whereby volatile matter was removed. The ceramic crucible was covered with the drop lid, was put in a ceramic B-type crucible, and was covered with coke particles. After being covered with a lid, the ceramic B-type crucible was heated for 30 minutes in an electric furnace maintained at 800° C. After being cooled, the ceramic crucible was weighed, followed by calculating the fixed carbon content thereof.

<Method for Measuring Viscosity>

The viscosity of the binder pitch was measured by a method according to ASTM D 5018-89 (2009) using a digital rotary viscometer, Model DV-II+, available from Brookfield Engineering Laboratories. In particular, 11 g of a sample, taken from the binder pitch, passing through an 840 μm (20 mesh) sieve was put in a dedicated chamber and was melted in a thermocontainer maintained at 160° C. A spindle was soaked in the melted sample. After the spindle reached 160° C., the rotation speed was adjusted such that the value of torque was about 100%, followed by reading the viscosity at the moment.

<Method for Measuring C/H Ratio of Binder Pitch>

The contents of carbon (C) and hydrogen (H) in the binder pitch were measured using an element analyzer, Model EA 110-CHNS-0, available from ThermoQuest Ltd., followed by calculating the C/H molar ratio. In particular, 5 mg of a sample, taken from the binder pitch, passing through a 250 μm (60 mesh) sieve was put in a dedicated cell for the element analyzer (Model EA 1110-CHNS-0). The sample was completely combusted, a $CO_2$ gas and $H_2O$ gas thereby generated were determined, and the contents of C and H in the sample are determined, followed by calculating the C/H ratio (molar ratio) thereof.

<Method for Measuring Mesophase Content and Free Carbon Content>

The contents carbon (C) and hydrogen (H) in a quinoline insoluble in the binder pitch were measured using the element analyzer (Model EA 1110-CHNS-0). The molar ratio (the C/H ratio of the quinoline insoluble) of carbon (C) to hydrogen (H) in the quinoline insoluble was calculated. Next, the mesophase content of the quinoline insoluble was determined from Equations (1) and (2) below using the C/H ratio of the quinoline insoluble on the assumption that the C/H ratio of free carbon (primary QI) was 3.5 and the C/H ratio (molar ratio) of mesophase (secondary QI) was 2.1. The mesophase content of the binder pitch was calculated from the mesophase content of the quinoline insoluble. A value obtained by subtracting the mesophase content from the quinoline insoluble content was regarded as the free carbon content.

$$(\text{C/H ratio of quinoline insoluble})=3.5\times(\text{free carbon content/quinoline insoluble content})+2.1\times(\text{mesophase content/quinoline insoluble content}) \quad (1)$$

$$(\text{Free carbon content})+(\text{mesophase content})=\text{quinoline insoluble content} \quad (2)$$

where the free carbon content, the mesophase content, and the quinoline insoluble content are given in mass percent.

Production of Binder Pitch

Examples 1 to 5 and Comparative Example 1

(1) Raw coal tar having a quinoline insoluble content shown in Table below was distilled at reduced pressure, whereby a soft pitch was obtained.

(2) The obtained soft pitch was thermally reformed at atmospheric pressure and a temperature of 325° C. to 345° C. for 5 hours, whereby a binder pitch having properties shown in Table was obtained.

Comparative Example 2

(1) Raw coal tar having a quinoline insoluble content shown in Table was distilled at reduced pressure, whereby a soft pitch was obtained.

(2) The obtained soft pitch was thermally reformed at atmospheric pressure and 305° C. for 5 hours, whereby a binder pitch having properties shown in Table was obtained.

An electrode was prepared using the binder pitch.

Properties of the electrode were investigated. The results are shown in Table 1.

Comparative Example 3

(1) Raw coal tar having a quinoline insoluble content shown in Table was distilled at reduced pressure, whereby a soft pitch was obtained.

(2) The obtained soft pitch was thermally reformed at atmospheric pressure and 380° C. for 5 hours, whereby a binder pitch having properties shown in Table was obtained.

<Production of Test Electrodes>

Each of test electrodes was produced from the binder pitch prepared in a corresponding one of Examples 1 to 5 and Comparative Examples 1 to 3 as described below.

(1) Filler Coke

Coke was crushed into powder, which was classified into a 4 to 8 mm particle size fraction, a 2 to 4 mm particle size fraction, a 1 to 2 mm particle size fraction, a 0.5 to 1 mm particle size fraction, a 0.25 to-0.5 mm particle size fraction, and a less than 0.25 mm particle size fraction. Filler coke with a controlled particle size was obtained by mixing 13% by mass of the 4 to 8 mm particle size fraction, 13% by mass of the 2 to 4 mm particle size fraction, 13% by mass of the 1-2 mm particle size fraction, 13% by mass of the 0.5 to 1 mm particle size fraction, 13% by mass of the 0.25 to 0.5 mm particle size fraction, and 35% by mass of the less than 0.25 mm particle size fraction.

(2) Kneading

A twin-screw kneader with an effective volume of 1 L was heated to 160° C. in advance. After being preheated to 160° C., 800 g of the filler coke was charged into the kneader. After the charged filler coke was stirred for 5 minutes, 130.2 g of the powdery binder pitch prepared in one of Examples 1 to 5 and Comparative Examples 1 to 3 was charged into the kneader, followed by kneading for 30 minutes, whereby paste containing the filler coke and the binder pitch was prepared.

(3) Forming

The prepared paste was transferred to a stainless steel vat and was then gradually cooled to 120° C. The cooled paste was charged into a cylindrical stainless steel vessel having a diameter of 70 mm and a height of 100 mm and was then pressed at 45 MPa for 60 seconds, whereby a test electrode was formed.

(4) Calcination

The formed test electrode was calcined at 1,170° C. for 5 hours.

(5) Machining

The calcined test electrode was machined to have a diameter of 50 mm, a height of 50 mm, and a cylindrical shape.

<Measurement of Properties of Test Electrodes>

The test electrodes produced as described above were measured for bulk density in accordance with "7 Test method for bulk density" of JIS R 7222:1997, compressive strength in accordance with "9 Test method for compressive strength" of JIS R 7222:1997 using a universal testing machine, and electrical resistivity by a four-probe method in accordance with "12 Test method for specific resistance" of JIS R 7222:1997.

As is clear from electrode properties shown in Table 1, the electrodes produced from the binder pitches produced in Examples 1 to 5 have higher bulk density, higher compressive strength, and lower resistivity as compared to the electrodes produced from the binder pitches produced in Comparative Examples 1 to 3. Therefore, the use of a binder pitch according to the present invention for a carbon material for electrodes for aluminium smelting, graphite electrodes for steelmaking, and the like allows the carbon material to have increased density, increased mechanical strength, and reduced electrical resistance.

TABLE I

| | | Examples | | | | | Comparative Examples | | |
|---|---|---|---|---|---|---|---|---|---|
| | | 1 | 2 | 3 | 4 | 5 | 1 | 2 | 3 |
| Coal tar | Quinoline insoluble (QI), mass percent | 5.2 | 5.8 | 7.0 | 10.0 | 13.0 | 2.9 | 5.5 | 7.0 |
| Binder pitch | C/H ratio of binder pitch, mole basis | 1.95 | 1.98 | 2.02 | 2.06 | 2.18 | 1.84 | 1.84 | 19.4 |
| | Quinoline insoluble (QI), mass percent | 12.3 | 13.1 | 15.0 | 17.0 | 22.4 | 5.6 | 9.1 | 15.0 |
| | Free carbon (primary QI), mass percent | 12.00 | 12.91 | 14.89 | 16.88 | 22.08 | 5.52 | 8.97 | 9.43 |
| | Mesophase (secondary QI), mass percent | 0.26 | 0.19 | 0.11 | 0.12 | 0.32 | 0.08 | 0.13 | 5.57 |
| | Toluene insoluble (TI), mass percent | 33.8 | 34.1 | 35.3 | 36.1 | 39.3 | 30.1 | 23.6 | 39.3 |
| | Fixed carbon (FC), mass percent | 60.9 | 61.3 | 62.0 | 62.1 | 62.4 | 57.0 | 56.2 | 63.0 |
| | Softening point (SP), ° C. | 111.0 | 112.0 | 110.3 | 112.2 | 110.0 | 110.0 | 111.2 | 110.3 |
| | C/H ratio of quinoline insoluble, mole basis | 3.47 | 3.48 | 3.49 | 3.49 | 3.48 | 3.48 | 3.48 | 2.98 |
| | Viscosity (@160° C.), mPa · s | 2,342 | 2,213 | 1,823 | 1,816 | 1,265 | 1,953 | 1,523 | 1,823 |
| Electrode properties | Bulk density, g/cm$^3$ | 1.594 | 1.603 | 1.620 | 1.631 | 1.638 | 1.564 | 1.532 | 1.578 |
| | Compressive strength, MPa | 63.8 | 65.7 | 69.0 | 71.0 | 72.6 | 49.3 | 48.4 | 48.7 |
| | Electrical resistivity, μΩm | 64.1 | 61.4 | 59.8 | 61.5 | 59.1 | 64.3 | 69.7 | 65.8 |

The invention claimed is:

1. A binder pitch having:

a carbon-to-hydrogen molar ratio in the range of 1.90 or more;

a quinoline insoluble content in the range of 17.0% to 30.0% by mass;

a free carbon content in the range of 12.0% to 30.0% by mass;

a mesophase content in the range of 0.50% by mass or less;

a toluene insoluble content in the range of 24.0% by mass or more; and a fixed carbon content in the range of 58.0% by mass or more.

2. The binder pitch according to claim 1, further having a softening point in the range of 90° C. to 120° C.

3. A method for producing the binder pitch of claim 2, the method comprising:

distilling coal tar with a quinoline insoluble content in the range of 3.0% to 25.0% by mass to obtain a soft pitch; and thermally reforming the obtained soft pitch at a temperature in the range of 320° C. to lower than 350° C. to obtain the binder pitch.

4. A method for producing the binder pitch of claim 1, the method comprising:

distilling coal tar with a quinoline insolubule content in the range of 3.0% to 25.0% by mass to obtain a soft pitch; and thermally reforming the obtained soft pitch at a temperature in the range of 320° C. to lower than 350° C. to obtain the binder pitch.

* * * * *